United States Patent [19]

Rodriguez

[11] 3,812,842

[45] May 28, 1974

[54] METHOD FOR LOCATING BLOOD VESSELS FOR CATHETERIZATION

[76] Inventor: Paul L. Rodriguez, 2116 N. Center, Garden City, Kans. 67846

[22] Filed: Jan. 18, 1973

[21] Appl. No.: 324,863

[52] U.S. Cl.................. 128/2 A, 250/312, 250/59, 33/174 D
[51] Int. Cl....................... A61b 5/00, G03b 41/16
[58] Field of Search ..... 250/312, 476, 59; 128/2 W, 128/2 S, 2 A, 2.08; 33/180 R, 174 D, 1 D

[56] References Cited
UNITED STATES PATENTS

| | | | |
|---|---|---|---|
| 1,904,234 | 4/1933 | Hoskin et al........................ | 250/476 |
| 2,428,980 | 10/1947 | McCann ........................... | 128/2.08 |
| 2,807,091 | 9/1957 | Michelson....................... | 33/174 R |
| 3,047,957 | 8/1962 | Conway ........................... | 33/174 D |
| 3,159,394 | 12/1964 | Burns............................... | 33/180 R |
| 3,358,373 | 12/1967 | Martin............................... | 128/2 S |
| 3,668,394 | 6/1972 | Panzer.............................. | 250/476 |
| 3,706,883 | 12/1972 | McIntyre .......................... | 250/312 |

Primary Examiner—Aldrich F. Medbery
Attorney, Agent, or Firm—Edward L. Brown, Jr.

[57] ABSTRACT

An indexing scale positioned on the exterior of the body of a human being includes markers that are visible in X-ray photographs to facilitate locating a particular blood vessel relative to the scale in an X-ray photograph. By reference to the X-ray, a movable indicator carried with the scale is positionable to indicate the location of the vessel relative to the scale on the exterior of the body. Under a fluoroscope, a catheter can then be guided into alignment with the indicator and thus into the vessel to catheterize same quickly and easily with minimum exposure to X-rays.

4 Claims, 7 Drawing Figures

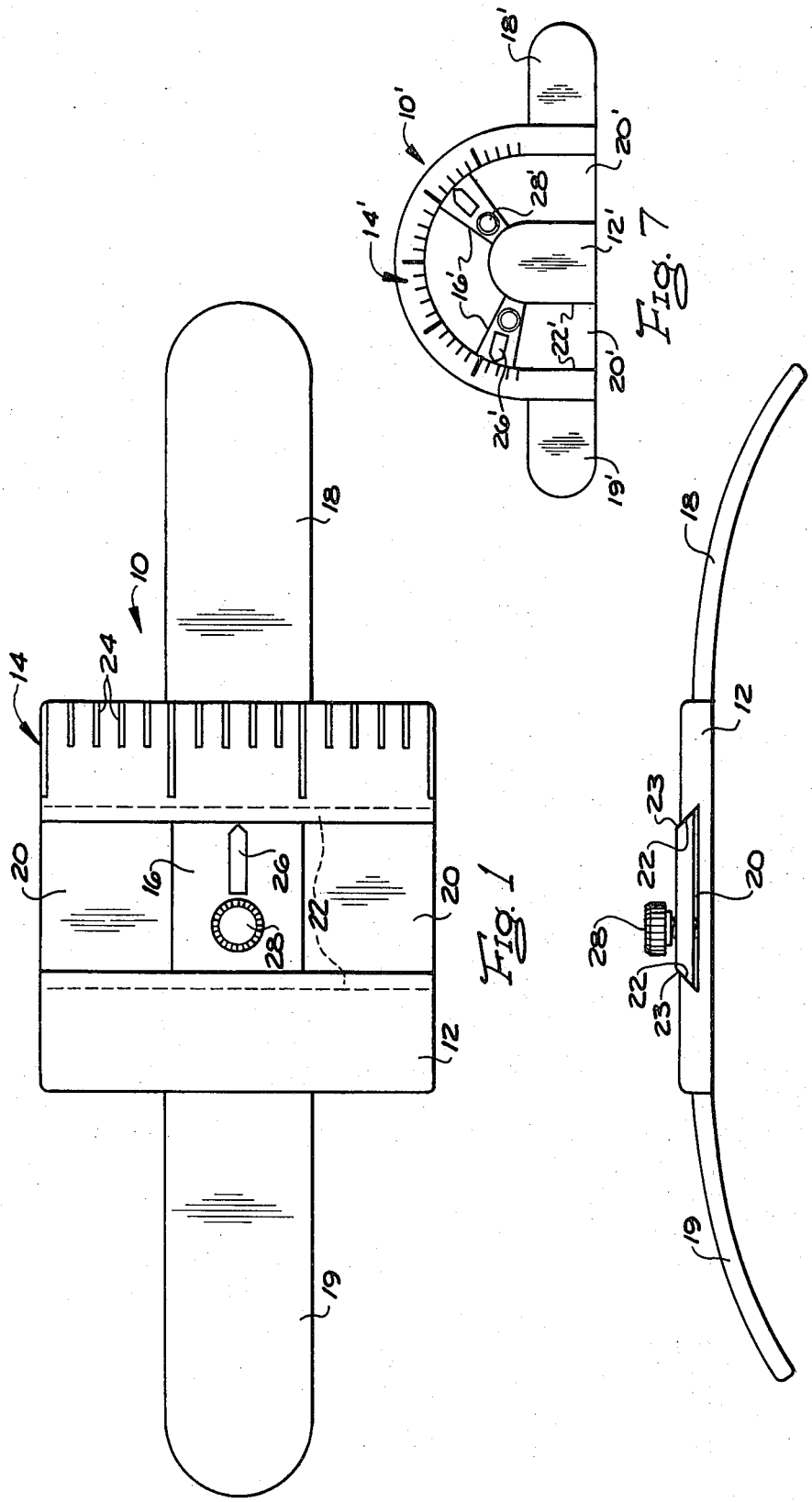

METHOD FOR LOCATING BLOOD VESSELS FOR CATHETERIZATION

This invention relates to an improved method of locating and catheterizing a sub vessel which branches from a main vessel in the body of a human being, and apparatus utilized in the improved method.

Catheterization of smaller vessels or arteries is extremely difficult due to the inability of precisely locating the particular vessel. Such catheterization procedure normally includes insertion of the catheter into one of the larger, easily located arteries, and then into the desired vessel at the location where such vessel branches from the main artery. While the main vessel and sub vessel can be made visible in X-ray photography by injection of proper dyes thereinto, it is highly undesirable and impractical to subject the patient, physician and technicians to the prolonged periods of exposure to X-rays that would be required in positioning the catheter by repeatedly X-raying the patient while alternately moving the catheter closer to the particular vessel desired to be catheterized.

Such technique involving X-ray photography of the arteries, referred to as the Selinger technique of Angiography, may be augmented by making references to anatomical landmarks to reduce X-ray exposure to an acceptable level. Such landmarks, however, are themselves hard to locate. Further, they do not provide exact reference points to the blood vessel in question in different patients. As a result, locating the precise point at which the sub vessel branches from the main vessel has been extremely difficult without subjecting patients to excessive exposure to X-ray radiation.

For purposes of the present invention, the terms "artery" and "vessel" are used interchangeably throughout, and reference to "vessel" is to be understood as including both vessels and arteries. Similarly, the term "sub vessel," refers to a smaller, difficult to locate vessel or artery which branches from a main vessel or artery in the body.

It is a primary object of the present invention to provide a method of precisely locating the point at which a sub vessel branches from a main vessel with minimum exposure to X-ray radiation by relatively locating this branch point on the exterior of the body.

An important object of the invention is to accomplish location of the branch point on the exterior of the body by placing indexing means which are visible in X-ray on the exterior of the body, then X-raying the blood vessels and by reference to the X-ray photograph locating the precise position on the indexing means that aligns with the branch point of the sub vessel.

Another important object in accordance with the preceding object is to mark this position on the indexing means by an indicator which is visible under a fluoroscope, so that a catheter (also visible under a fluoroscope) can then be manipulated into alignment with the indicator while viewing through a fluoroscope, and thereby insert the catheter into the sub vessel with minimum exposure to X-ray radiation.

Another object of the invention is to place the indexing means in the general area of the branching point of the sub-vessel prepatory to proper X-raying of the area by first inserting the catheter through the main vessel to the general area of the branch point, and then while viewing the catheter under a fluoroscope positioning the indexing means on the exterior of the body directly over the general area of the branch point.

Yet another primary object of the present invention is to provide indexing means for use in the above-described method which includes an indexing scale located on the exterior of the body and which has a plurality of separate markers thereon that are visible in X-ray photograph so that upon X-raying the blood vessels one of these markers will be aligned with and indicate the point at which the sub vessel branches from the main vessel, subsequent identification of this one marker thereby locating the position of the branch point on the exterior of the body.

Another object of the invention is to provide indexing means which includes an indicator slidably carried on a carriage that carries the indexing scale so that the indicator can be moved into alignment with the marker locating the branch point, the indicator being visible under a fluoroscope to facilitate manipulating the catheter into alignment with the indicator and thereby into the sub vessel while viewing the catheter and indicator under a fluoroscope, the carriage and portions of the indexing scale other than the markers being invisible in X-ray photograph to prevent obstruction of visibility of the relative locations of the markers to the sub vessel branch point in the X-ray photograph.

A more particular object is to provide a carriage of the character described which is contoured to the shape of the body of the patient to facilitate securement of the carriage flatly against the body and minimize distortion in the X-ray photograph of the relative locations of the markers to the sub vessel.

These and other objects and advantages of the present invention are specifically set forth in or will become apparent from the following detailed description of a preferred embodiment of the invention when read in conjunction with the accompanying drawings, wherein:

FIG. 1 is a top plan view of indexing means constructed in accordance with the principles of the present invention;

FIG. 2 is a side elevational view of the indexing means of FIG. 1;

FIG. 7 is a top plan view of a modified embodiment of the invention.

Figure 3:
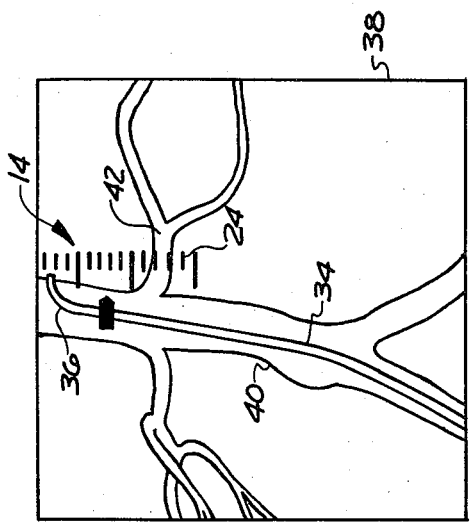
FIG. 3 is an elevational view of the indexing means secured to the chest of a patient and a catheter inserted into the abdominal aorta as viewed through a fluoroscope.

Referring now more particularly to FIGS. 1 and 2, there is illustrated indexing means 10 which generally includes a carriage 12, and indexing scale 14 and movable member 16. Carriage 12 includes a pair of oppositely transversely extending, arcuately contoured arms 18 and 19 adapted to be secured to the body of a patient, the arms 18 and 19 herein illustrated being curved to lie flatly across a patient's chest (FIG. 2). Carriage 12 also has a longitudinally extending, linear central groove 20 that has inwardly inclined longitudinal sidewalls 22. Carriage 12 is preferably formed of light-weight, inexpensive plastic material invisible under a fluoroscope and in X-ray photography.

Indexing scale 14 includes a plurality of separate lines 24 in the form of lead inlays mounted to carriage 12 in substantially equally spaced relationship along the length of groove 20. Lines 24 are preferably spaced approximately 1 mm apart with every fifth line of a different length to facilitate identification. The lines 24 are manufactured of lead or a similar metallic material visible in X-ray photographs.

Movable member 16 includes an arrow inlay or indicator 26 which points toward one of the lines 24 on the indexing scale 14. Indicator 26 is also formed of material visible under a fluoroscope or in X-ray photography. Member 16 has beveled sidewalls 23 correspondingly inclined in mating relationship to the inclined sidewalls 22 of the groove so that the groove 20 defines a captive track, slidably receiving member 16. A thumb screw 28 is threadably received in member 16 and can be advanced therethrough to bear against the bottom face of groove 20 to hold member 16 in stationary relationship on carriage 12.

METHOD OF USE

Figure 4:
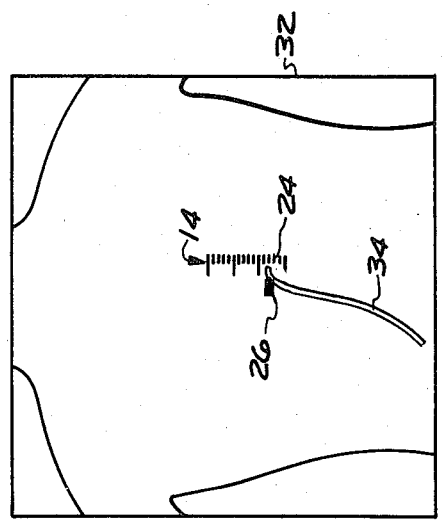
FIG. 4 is an elevational representation of an X-ray photograph of the abdominal aorta and the indexing means.

Indexing means 10 may be utilized in the following manner to locate a particular sub vessel in the body; for instance the right renal artery which branches from the abdominal aorta. Indexing means 10 is first placed and secured onto the exterior of the patient's body 30 over the general area where the right renal artery branches from the abdominal aorta, as illustrated in FIG. 3. Preferably this step is carried out by viewing through a fluoroscope screen 32, a catheter 34 which has previously been inserted into the abdominal aorta so that the general location of the abdominal aorta may be seen. Arms 18 and 19 of indexing means 10 are secured to the chest of the patient by adhesive tape 35, with the indexing scale 14 positioned along side of the catheter 34. Preferably, catheter 34 has a curved tip 36, as seen in FIG. 4, to facilitate locating and insertion in the branch sub vessel, in this case the right renal artery 42. For illustrative clarity, the entire indexing means 10 is shown in FIG. 3 as being visible under the fluoroscope, though it is necessary to see only the indicator 26 and the scale 14.

Next, an appropriate dye is injected into the abdominal artery and an X-ray picture is taken, so that the main artery and the right renal branch will be visible in the X-ray photograph 38 of FIG. 4. In the photograph 38, the abdominal aorta 40 is shown with the catheter 34 positioned therein and right renal artery 42 branching off to the right. The superimposed indexing scale 14 and indicator 26 are also visible. Accordingly, the relative position of the branch point to the third line 24 of the index scale can be noted by reference to photograph 38.

Figure 5:
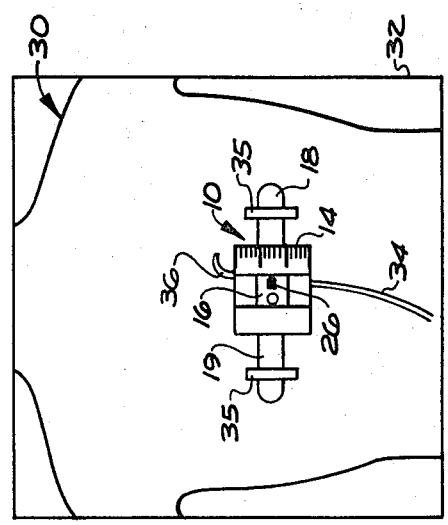
FIG. 5 is an elevational view of the chest of the patient with the indicator of the indexing means being moved into alignment with the point at which the sub vessel desired to be catheterized branches from the abdominal aorta.

Without further X-ray and use of a fluoroscope, the sliding indicator 26 is moved into alignment with the third line 24 on the indexing scale, as read from the X-ray of FIG. 4. The location of indicator 26 in FIG. 5 thereby locates, on the outside of the body, the relative position of the branching point of the right renal artery.

Figure 6:
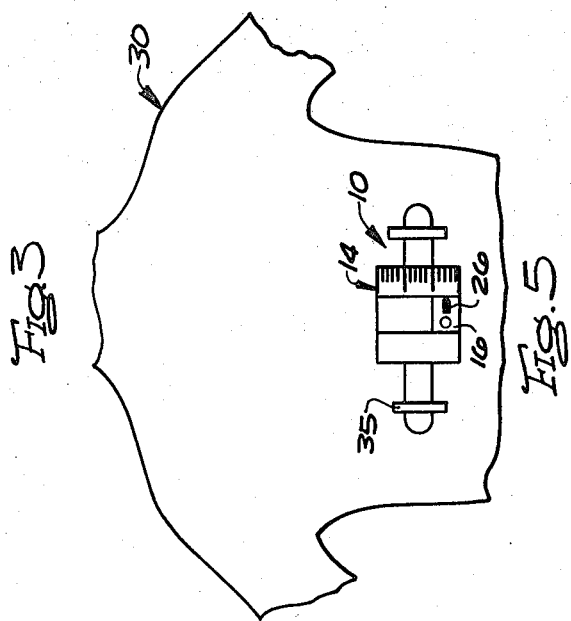
FIG. 6 is an elevational view of the step of positioning the tip of the catheter into alignment with the indicator and into the sub vessel by viewing the catheter and indicator under a fluoroscope.

Finally, as illustrated through a fluoroscope in FIG. 6, catheterization of the right renal artery is accomplished by positioning the catheter 34 within the aorta until the tip 36 thereof aligns with indicator 26. Accordingly, the curved catheter tip is located inside the right renal artery 42.

The carriage 12 illustrated with a linear groove 20 may alternately have an arcuate shaped groove, as illustrated in FIG. 7, in order to facilitate location of other sub vessels which may branch off a different shaped main vessel such as the aortic arch. Carrier 12' has a semi-circular shape with an arcuate groove 20', having similar beveled sidewalls 22', as shown in FIG. 2. The curvature of groove 20' is similar to that of the aortic arch, not shown in the drawing. The slidable indicators 26 are releasably held by similar thumb screws 28'. The presence of two indicators 26' permits the location of two sub vessels with a single X-ray photograph. The index scale 14' could alternately be placed on the inside of the groove 20'. Various other arcuate shaped grooves could be used for different shaped vessels.

Having thus described the invention, what is claimed as new and desired to be secured by Letters Patent is:

1. A method of locating and catheterizing a particular sub vessel branching from a main blood vessel in the body of a human being, comprising the steps of:
   placing indexing means having a movable indicator and a non-movable indexing scale which is visable in X-ray photography on the exterior of the body in the general area of the sub-vessel;
   injecting a radiopaque dye into the main vessel to cause the sub vessel to be visible in X-ray photography;
   making an X-ray photograph of said general area to determine the relative location on the indexing scale to the point at which said sub vessel branches from the main vessel;
   moving said indicator along said scale to position the indicator in alignment with said point at which the sub vessel branches from the main vessel by reference to said photograph;
   inserting a catheter within the main vessel; and
   catheterizing the sub vessel by positioning the the end of the catheter, as viewed through a fluoroscope, in alignment with said moved indicator to thereby locate said end of the catheter in said sub vessel.

2. A method as set forth in claim 1, wherein said step of inserting the catheter within the main vessel occurs prior to said step of placing the indexing means in said general area.

3. A method as set forth in claim 2, wherein said step of placing the indexing means in said general area includes positioning said indexing means on the exterior of the body over said general area by reference to the position of said catheter within the body while viewing said catheter by fluoroscopy.

4. A method as set forth in claim 1, wherein said indicator is visible under a fluoroscope, said step of catheterizing the sub vessel including viewing the catheter and said indicator by fluoroscopy to facilitate locating said end of the catheter in alignment with said indicator.

* * * * *